(12) United States Patent
Robertson et al.

(10) Patent No.: US 9,117,007 B2
(45) Date of Patent: Aug. 25, 2015

(54) VISUALIZATION OF STREAMING REAL-TIME DATA

(75) Inventors: George G. Robertson, Seattle, WA (US); Christian Bernd Schormann, Seattle, WA (US); Brian Scott Ruble, Redmond, WA (US); Danyel A. Fisher, Seattle, WA (US); Jakob Peter Nielsen, Redmond, WA (US); Nathan Paul McCoy, Woodinville, WA (US); William G. Morein, Cambridge, MA (US); Michael Ehrenberg, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 587 days.

(21) Appl. No.: 12/120,264

(22) Filed: May 14, 2008

(65) Prior Publication Data

US 2009/0287814 A1   Nov. 19, 2009

(51) Int. Cl.
*G06F 15/16* (2006.01)
*G06Q 40/00* (2012.01)
*G09B 19/00* (2006.01)
*G06F 17/30* (2006.01)
*G06Q 10/10* (2012.01)
*H04L 29/06* (2006.01)

(52) U.S. Cl.
CPC .......... *G06F 17/30994* (2013.01); *G06Q 10/10* (2013.01); *H04L 65/605* (2013.01)

(58) Field of Classification Search
CPC ............... G06F 3/0484; G06F 8/34; G05B 2219/32128; G06T 11/206; H04L 65/605; H04L 67/025
USPC .......... 707/5; 345/156, 433; 709/224
See application file for complete search history.

(56) References Cited

U.S. PATENT DOCUMENTS

| | | | | |
|---|---|---|---|---|
| 3,574,283 A | * | 4/1971 | Albers .......................... | 73/178 R |
| 4,025,765 A | * | 5/1977 | Giras et al. .................... | 700/290 |
| 4,873,623 A | * | 10/1989 | Lane et al. ....................... | 700/83 |
| 4,899,276 A | * | 2/1990 | Stadler .......................... | 715/705 |
| 5,414,809 A | * | 5/1995 | Hogan et al. .................. | 715/765 |
| 5,517,193 A | * | 5/1996 | Allison et al. .............. | 342/26 R |
| 5,537,528 A | * | 7/1996 | Takahashi et al. ............ | 715/255 |
| 5,761,442 A | * | 6/1998 | Barr et al. ................... | 705/36 R |

(Continued)

FOREIGN PATENT DOCUMENTS

WO     WO2008011332 A2     1/2008

OTHER PUBLICATIONS

Streaming Data and Visualization for Content Management, Feb. 12, 2006 http://www.content-wire.com/streaming-data-and-visualization-content-management. Last accessed Apr. 11, 2008, 22 pages.

(Continued)

*Primary Examiner* — Arvin Eskandarnia
*Assistant Examiner* — Margishi Desai
(74) *Attorney, Agent, or Firm* — Micah P. Goldsmith; Judy Yee; Micky Minhas

(57) ABSTRACT

A system facilitates dynamic data visualizations. The system includes an analysis component that periodically processes one or more incoming data streams to determine a visualization form from a plurality of visualization forms. A visualization component dynamically generates the visualization form based in part on the processing of the incoming data streams.

20 Claims, 11 Drawing Sheets

(56) References Cited

U.S. PATENT DOCUMENTS

| | | | |
|---|---|---|---|
| 5,805,781 A * | 9/1998 | McIntyre et al. | 358/1.18 |
| 6,240,450 B1 * | 5/2001 | Sharples et al. | 709/224 |
| 6,266,067 B1 * | 7/2001 | Owen et al. | 345/619 |
| 6,374,225 B1 * | 4/2002 | Hejna, Jr. | 704/270 |
| 6,687,750 B1 * | 2/2004 | Messinger et al. | 709/224 |
| 6,750,864 B1 * | 6/2004 | Anwar | 345/440 |
| 6,763,353 B2 | 7/2004 | Li et al. | |
| 6,985,898 B1 * | 1/2006 | Ripley et al. | 1/1 |
| 7,102,643 B2 * | 9/2006 | Moore et al. | 345/473 |
| 7,180,516 B2 | 2/2007 | Kapler et al. | |
| 7,188,151 B2 | 3/2007 | Kumar et al. | |
| 7,231,483 B2 * | 6/2007 | Gros et al. | 710/305 |
| 7,243,124 B1 | 7/2007 | Gardner et al. | |
| 7,315,659 B2 * | 1/2008 | Lunetta et al. | 382/284 |
| 7,321,367 B2 * | 1/2008 | Isakovic et al. | 345/502 |
| 7,415,697 B1 * | 8/2008 | Houlding | 717/104 |
| 7,512,289 B2 * | 3/2009 | Scheier et al. | 382/305 |
| 7,539,677 B1 * | 5/2009 | Wong et al. | 1/1 |
| 7,589,732 B2 * | 9/2009 | Burtnyk et al. | 345/474 |
| 7,627,668 B2 * | 12/2009 | Cardno et al. | 709/224 |
| 7,876,276 B1 * | 1/2011 | Zaman et al. | 343/703 |
| 2002/0013834 A1 * | 1/2002 | Esakov et al. | 709/223 |
| 2002/0109680 A1 * | 8/2002 | Orbanes et al. | 345/418 |
| 2002/0161582 A1 * | 10/2002 | Basson et al. | 704/260 |
| 2003/0090506 A1 * | 5/2003 | Moore et al. | 345/730 |
| 2004/0036673 A1 * | 2/2004 | Boswell et al. | 345/156 |
| 2004/0085335 A1 * | 5/2004 | Burlnyk et al. | 345/716 |
| 2004/0117272 A1 * | 6/2004 | Shehab | 705/27 |
| 2004/0196287 A1 | 10/2004 | Wong et al. | |
| 2004/0205185 A1 * | 10/2004 | Leonik | 709/224 |
| 2005/0240456 A1 * | 10/2005 | Ward et al. | 705/7 |
| 2005/0289124 A1 * | 12/2005 | Kaiser et al. | 707/3 |
| 2006/0078308 A1 * | 4/2006 | Yamanaka et al. | 386/111 |
| 2006/0171457 A1 * | 8/2006 | DeGarrido et al. | 375/240.03 |
| 2006/0271883 A1 * | 11/2006 | Bier et al. | 715/853 |
| 2006/0294153 A1 * | 12/2006 | Kumar et al. | 707/200 |
| 2007/0033279 A1 * | 2/2007 | Battat et al. | 709/224 |
| 2007/0169054 A1 * | 7/2007 | Cheng et al. | 717/156 |
| 2007/0180408 A1 | 8/2007 | Rusu et al. | |
| 2007/0203816 A1 * | 8/2007 | Costache et al. | 705/35 |
| 2007/0245238 A1 | 10/2007 | Fugitt et al. | |
| 2007/0288633 A1 | 12/2007 | Mullarkey | |
| 2008/0140414 A1 * | 6/2008 | Hejna | 704/270 |
| 2008/0229296 A1 * | 9/2008 | Kanai | 717/154 |
| 2008/0250357 A1 * | 10/2008 | Lee et al. | 715/853 |
| 2008/0288255 A1 * | 11/2008 | Carin et al. | 704/256.1 |
| 2009/0006226 A1 * | 1/2009 | Crowder | 705/30 |
| 2009/0085916 A1 * | 4/2009 | Shamilian et al. | 345/440 |
| 2009/0089225 A1 * | 4/2009 | Baier et al. | 706/12 |
| 2009/0204531 A1 * | 8/2009 | Johnson | 705/35 |
| 2009/0259521 A1 * | 10/2009 | Yitts | 705/10 |
| 2009/0278848 A1 * | 11/2009 | Robertson et al. | 345/440.2 |
| 2009/0306966 A1 * | 12/2009 | Hejna, Jr. | 704/9 |
| 2009/0319931 A1 * | 12/2009 | Hutchings et al. | 715/771 |
| 2010/0002142 A1 * | 1/2010 | Finn et al. | 348/571 |
| 2010/0185993 A1 * | 7/2010 | Baumgartner et al. | 716/5 |
| 2011/0279462 A1 * | 11/2011 | Bakalash et al. | 345/505 |

OTHER PUBLICATIONS

Goldin, et al. Dynamic Isoline Extraction for Visualization of Streaming Data http://www.engr.uconn.edu/~dqg/papers/csr06.pdf. Last accessed Apr. 11, 2008, 12 pages.

Schwartz. LiveView3D: Real Time Data Visualization for the Aerospace Testing Environment http://ntrs.nasa.gov/archive/nasa/casi.ntrs.nasa.gov/20060004830_2006004433.pdf. Last accessed Apr. 11, 2008, 12 pages.

* cited by examiner

VISUALIZATION OF STREAMING REAL-TIME DATA

BACKGROUND

A casual glance at a modern television broadcast highlights how electronic data presentations have become ubiquitous to everyday experiences. From broadcasts that graphically illustrate one statistic or trend over another to the ever competitive business presentations that provide consumers with up-to-the minute details and analysis of micro and macroeconomic news. Perhaps the most common experience is viewing linear graphs at the end of the day that depicts how the Dow Jones industrial averages have performed on a given day. Such data is often shown as a trend analysis where the overall performance has increased, decreased, and peaked or declined along a linear graph—over a short period of time. Oftentimes, particular market segments are analyzed, charted and displayed, whereas in other instances, individual corporations or other entities are presented and viewed for further analysis.

In all these visualization examples and others, although the actual data may be changing to update the particular graph of interest, the form or nature of the graph remains unchanging (e.g., a bar graph showing NBA scoring averages over time remains a bar graph form regardless if the averages have changed in some manner that might warrant another visualization). Thus, current visualization schemes do not have the ability to adjust the actual form over time even though another type or form of visualization for the respective data may be more appropriate at a given point in time. The following describes other current visualization techniques that suffer from static or rigid presentation capabilities.

In another example of a visualization technology, three dimensional (3D) visualizations may be shown in the form of a relief chart where data is represented as peaks and valleys over different portions of a three dimensional graph. These are powerful tools that allow one to view and more importantly analyze data. Such tools include many features such as viewpoints that enable users to view visualizations based upon pre-defined "viewpoints" which can be defined by users based upon terms of interest. These can also include viewing visualizations based on measurement of affect (emotion) and other evidence data. Other features include copying of networks, administrator modification of networks, and time query capabilities.

The 3D tool allows Boolean query results to be ranked in a document viewer according to their relevance to an initial query, where users can enter annotations in files and also query the annotations via a query tool. This also includes providing user interfaces for the query tool, font size control for a document viewer and visualizations functions such as "Right Click" query on selected text, and user specified ordering in a correlation tool. Streaming data feed visualizations can also be accommodated by the 3D tool that continuously updates dataset visualizations from a news feed or other type of incrementally updated textual source. This can include data sharing where document lists are exchanged and associated metadata with other information systems is collected. Interface aspects of the 3D tool allow user-defined source document retrieval to access source documents via a user provided executable, enabling users to define how documents should be accessed or pre-processed before being sent to the viewer. As noted previously however, the 3D tool although able to update changing data per a pre-defined visualization/output format, does not alter the static capabilities or form of the overall data output represented by the respective visualization.

Other visualization tools include information models that are flexible and powerful yet still statically coupled to a pre-defined visualization display. Information models are capable of tightly integrating disparate, multi-format (and multimedia) information and data—enabling concurrent analysis. Another model addresses security problems by assessing web sites automatically, incorporating Internet site harvesting, web page characterization, link visualization, and complete analysis functionality. Still yet another tool provides a graphical wall designed to help users more easily monitor and explore continually updating text sources such as news or other reports, through a high-resolution touch-screen interface. In yet another tool surveyed, data mining software has been developed for handling large volumes of information relevant to the scientific and business needs of life and chemical sciences industries. The associated mining methods provide visualization schemes for high-dimensional data, coupled with a suite of interactive tools to enable efficient data mining. The tool visualizations are applicable to many data types that allow integrated views of diverse information including unstructured text, numerical data, categorical information, and genomic sequences. In all these example systems, although data may change a pre-defined format display (e.g., cause a data mountain to grow or shrink, cause a linear graph to change peaks and valleys), the nature of the display itself remains unchanged and that may hinder efficient data analysis.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Dynamic analysis and presentation components are provided that allow real time processing of streamed data and enable dynamic visualizations that can adapt and change over time in view of the data. Thus, not only can the respective data alter the features of a given display format such as an initial display output, but an entirely different visualization display can be dynamically determined, selected and generated in real-time based off of available data received and based upon further automated analysis. In one aspect, streaming data is analyzed periodically over time. Based on limited information, one form of presentation or visualization may be selected initially to present the data. As more data is received from various data sources, analytical processes can determine the most appropriate visualization based on a determination that the received data is more suitably represented in a subsequent form (or forms). For instance, an initial display may suit a linear chart based upon available evidence for the display (e.g., evidence from the initial data received thus far). As data is received over time, it may be determined that a three dimensional display having graphical components that are connected via a tree or other representation from the initial chart is better suited to the analyzed data set. A plurality of forms and presentation formats can be dynamically selected based off of present analysis of incoming data. Transition components can be provided in order to visually aid users when viewing output format changes in order to smooth transitions from one visualization form to another.

In yet another aspect, real-time, streaming data is analyzed according to trends or other type of analysis detected in the data that may indicate or predict what will happen in the future based off of presently received data values. Data mining and/or inference techniques derived from learning components are applied to data that has been received at a particular point in time. Based off of mining or learning on the received data, predictive values are generated and subsequently visualized according to one or more dynamically determined display visualizations for the respective predictions. Such visualizations can provide useful insights to those viewing the data, where predictive information is visualized to indicate how data or outcomes might change based on evidence gathered at a particular point in time. Feedback options can be provided to enable users to guide visualizations or further query the system for other types of predictive analysis based in part on the respective query supplied to the system.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Systems and methods are provided to facilitate dynamic display generations and transitions in view of incoming streamed data. In one aspect, a system facilitates dynamic data visualizations. The system includes an analysis component that periodically processes one or more incoming data streams to determine a visualization form from a plurality of visualization forms. A visualization component dynamically generates the visualization form based in part on the processing of the incoming data streams. The analysis component can include a visualization format selector, a data mining component, or an inference component.

As used in this application, the terms "component," "analysis," "transition," "visualization," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
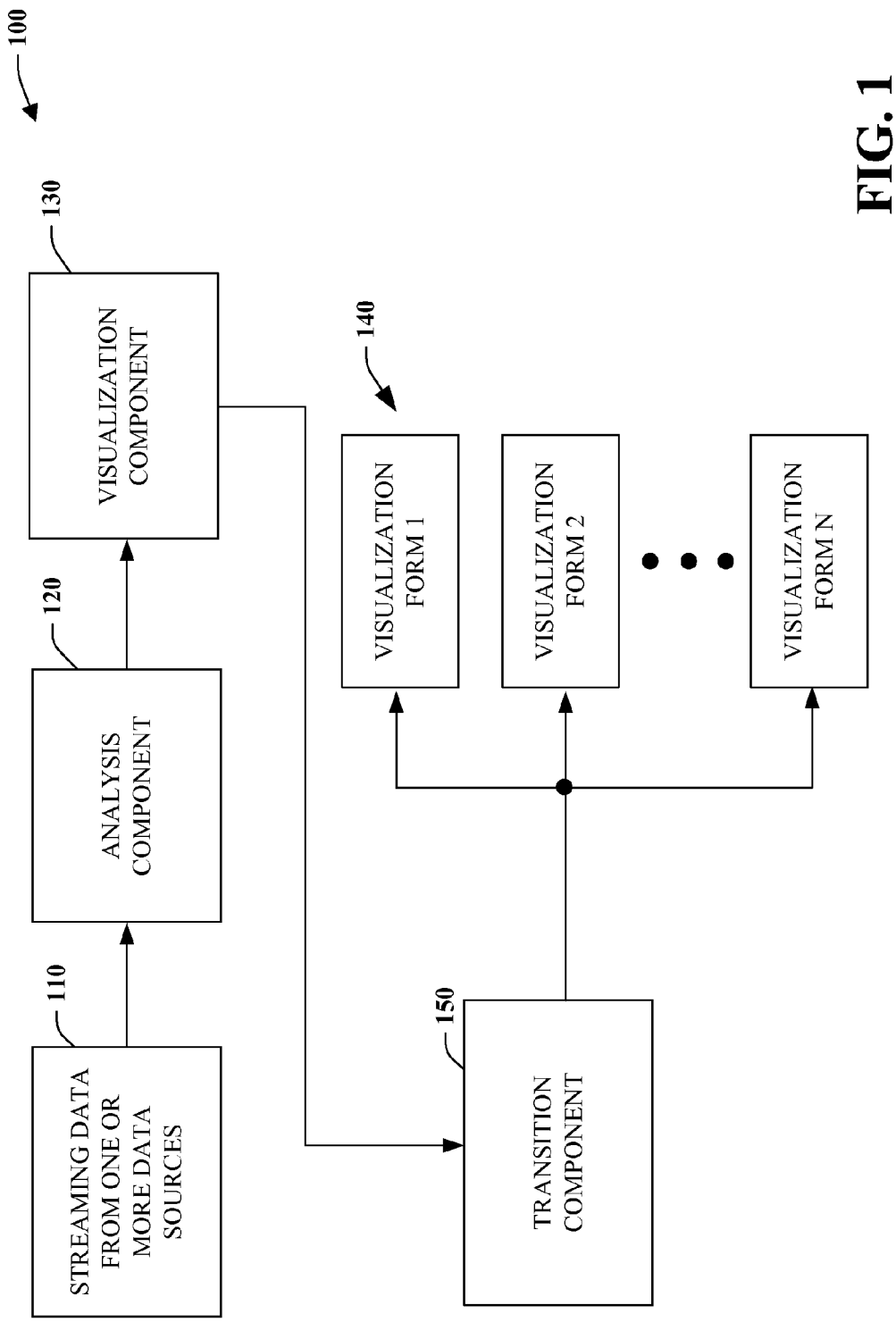
FIG. 1 is a schematic block diagram illustrating a system for generating dynamic visualizations.

Referring initially to FIG. 1, a system 100 is illustrated for generating dynamic visualizations. Streaming data 110 is received from one or more data sources. Such data 110 can be collected from wireless sources, local or remote data sources, public or private networks such as the Internet for example. An analysis component 120 processes the streaming data 110 to determine a suitable visualization. The analysis can include observing data over time, applying the data to a suite of potential visualizations, curve fitting or other graphical techniques, linear regressions, and substantially any mathematical or statistical technique that enables a determination (or selection) of a suitable form in which to visualize the data 110. This can also include receiving cues (codes indicating one or more potential data display forms) in the data stream 110 that may indicate one form over another. After a suitable form or forms have been selected by the analysis component 120, a visualization component 130 dynamically generates output data for a potential visualization which is illustrated as one or more visualization forms 140 (shown as forms 1-N, where N is a positive integer).

The visualization forms 140 can be substantially any display or output type including graphs, charts, trees, multidimensional depictions, images (computer generated or digital captures), video/audio displays describing the data 110, hybrid presentations where output is segmented into multiple display areas having different data analysis in each area and so forth. As shown, a transition component 150 can be provided to allow morphing of one visualization form 140 to another as the streaming data 110 changes over time. It is noted that an initial form 140 may be selected based off an assumption about the data stream 110. As time passes and more data is collected, a subsequent visualization form or forms 140 can be generated based off of further analysis and subsequent dynamic selection of the most suitable form for the data. As will be described in more detail below with respect to FIG. 2, other types of processing provided by the analysis component 110 can include data mining or inference determinations to add predictive qualities to the visualization forms 140.

In general, the system 100 provides dynamic analysis and presentation components that allow real time processing of the streamed data 110 and enables one or more visualizations 140 that can adapt and change over time in view of the data. Thus, not only can the respective data 110 alter the features of a given display format such as an initial display output at 140, but an entirely different visualization display 140 (e.g., Visualization Form 2 selected after initially displaying Visualization Form 1) can be dynamically determined by the analysis component 120. After analysis, the most suitable visualization form 140 can be selected and generated in real-time by the visualization component 130 based off of available streaming data 110 received.

In one aspect, streaming data 110 is analyzed periodically over time. Based on limited information, one form of presentation or visualization may be selected initially to present the data. As more data is received from various data sources 110, analytical processes can determine the most appropriate visualization based on a determination that the received data is more suitably represented in a subsequent form 140 (or forms). For instance, an initial display may suit a horizontal bar graph based upon available evidence for the display (e.g., evidence from the initial data received thus far). As streaming data 110 is received over time, it may be determined that a display having graphical components that are connected via a tree or other representation from the initial graph is better suited to the analyzed data set. A plurality of forms 140 and presentation formats can be dynamically selected based off of present analysis of incoming data 110. As noted above, the transition component 150 can be provided in order to visually aid users when viewing output format changes. Thus, in order to smooth transitions from one visualization form to another, the transition component 150 can gradually morph or transition one or more images into one or more subsequent displays. Smoothing provides continuity to the user to enable them see what is happening—otherwise they may get lost in the transition.

In another aspect, the system 100 can be triggered off of events detected in the streaming data 110. This includes detecting events that may propagate though aggregated data 110 to indicate that a change has occurred in the data. Thus, a visualization form 140 can be generated from an event model, e.g., a line graph growing pixel by pixel, where the system 100 predicts what the visualization should look like and constructs the visualization in real time. As data set changes, a new sampling may decide to change the visualization 140 based on newly collected or aggregated data. An example includes red and blue states shifting into different colors as votes come in, where the analysis component 120 selects the best visualization at that time. For instance, a map of the United States shows a state turning from red to blue, where the analysis component further selects a county map as the subsequent visualization form 140 to illustrate why that particular state has shifted from one voting demographic to another (e.g., red to blue). The system 100 can also provide multiple levels of rollback that can be provided along dimensions of time. Thus, a rollback feature allows users to determine the source of uncertainty, e.g., how did a sales opportunity change over time, where controls are provided to cause a current presentation to roll-back into a previous display in order to better understand the change of data over time.

It is noted that data for the system 100 can be gleaned and analyzed from a single source or across multiple data sources, where such sources can be local or remote data stores or databases. This can include files or data structures that maintain states about the user (or other entities such as corporations) and can be employed to determine future states. These can be past action files for instance that store what a user has done in the past and can be used by intelligent components such as classifiers to predict future actions. Related aspects can be annotating or processing metadata that could be attached as visualizations to e-mails or memoranda for example. Visualization data can be employed to facilitate interpersonal sharing, trusted modes, and context/intent sharing for example. Data which can be stored can also be employed to control virtual media presentations and control community interactions such as the type of interface or avatar that may be displayed for a respective user on a given day. Interactive visualization data can be generated in view of the other data. In another aspect, a visualization system 100 is provided. The system 100 includes means for monitoring data (analysis component 120) over time and means for determining (visualization component 130) at least one visualization from the data. The system 100 also includes means for generating the visualization (transition component 150).

Figure 2:
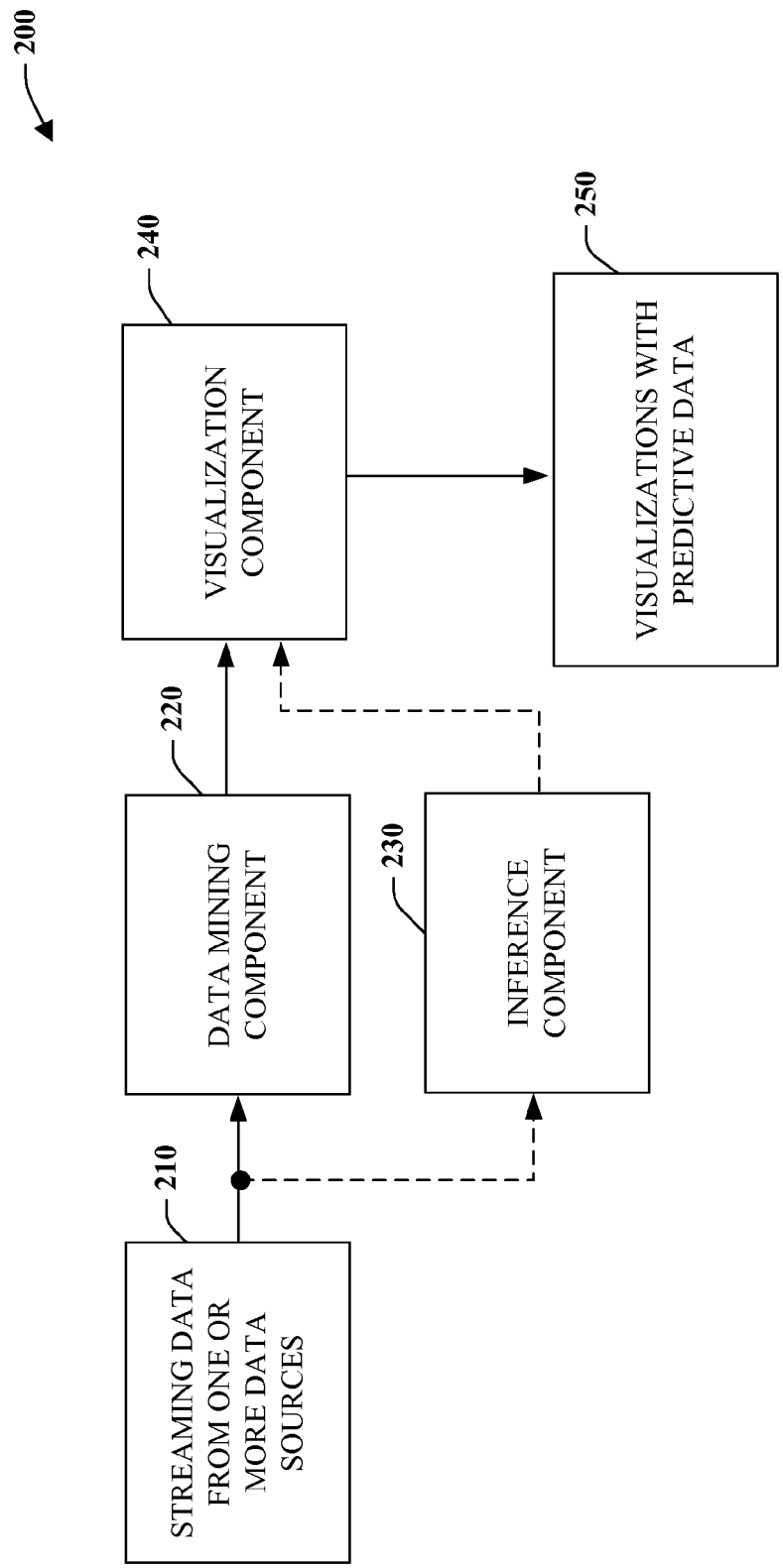
FIG. 2 is a block diagram that illustrates a visualization system that generates predictive values from real-time data streams.

Referring now to FIG. 2, a visualization system 200 generates predictive values from real-time data streams. In this aspect, one or more data streams 210 are collected or aggregated. The data streams 210 can be processed by a data mining component 220 and/or an inference component 230 to determine one or more predictive values from the data streams. Such values can be employed to determine other more suitable visualizations or the values can be utilized to enhance a present visualization by augmenting the data with predictive information. As illustrated, after predictive information is determined from the data streams 210, a visualization component 240 dynamically generates a visualization at 250 that utilizes the predictive data determined by the data mining component 220 or the inference component 230. Although not shown, a transition component can also be employed to facilitate smooth transitions of visualizations at 250 (e.g., smooth referring to gradually changing one display form to another).

The system 200 operates in a predictive or inference based mode and can be employed to supplement the analysis depicted in FIG. 1. Thus, even though a present data set may be partial or incomplete, the system 200 does not have to wait for all data to be collected but can generate refined data based off of predictions for missing members in the data set in real time. Predictions can also include observing trends in the data and predicting where subsequent data may be lead. Controls can be provided to enable users to enter queries or define policies that instruct the data mining component 220 or the inference component 230 for the types of predictive information that may be of interest to a particular user. This includes anticipating a visualization 250 based off a function of data 210 received to that point. The system 200 can be employed as a predictive system for creating visualizations and dynamically refine the predictions or associated visualizations over time. Such predictive qualities can be applied to changing screen/display problems, where predictions and visualizations become more certain over time as data is collected.

In yet another aspect, real-time, streaming data 210 is analyzed according to trends or other type of analysis detected in the data that may indicate or predict what will happen in the future based off of presently received data values. Data mining 220 and/or inference components 230 (e.g., inference derived from learning components) are applied to data that has been received at a particular point in time. Based off of mining or learning on the received data, predictive values are generated and subsequently visualized at 250 according to one or more dynamically determined display visualizations for the respective predictions. Such visualizations can provide useful insights to those viewing the data, where predictive information is visualized to indicate how data or outcomes might change based on evidence gathered at a particular point in time. Feedback options (not shown) can be provided to enable users to guide visualizations or further query the system 200 for other types of predictive analysis based in part on the respective query supplied to the system.

Figure 3:
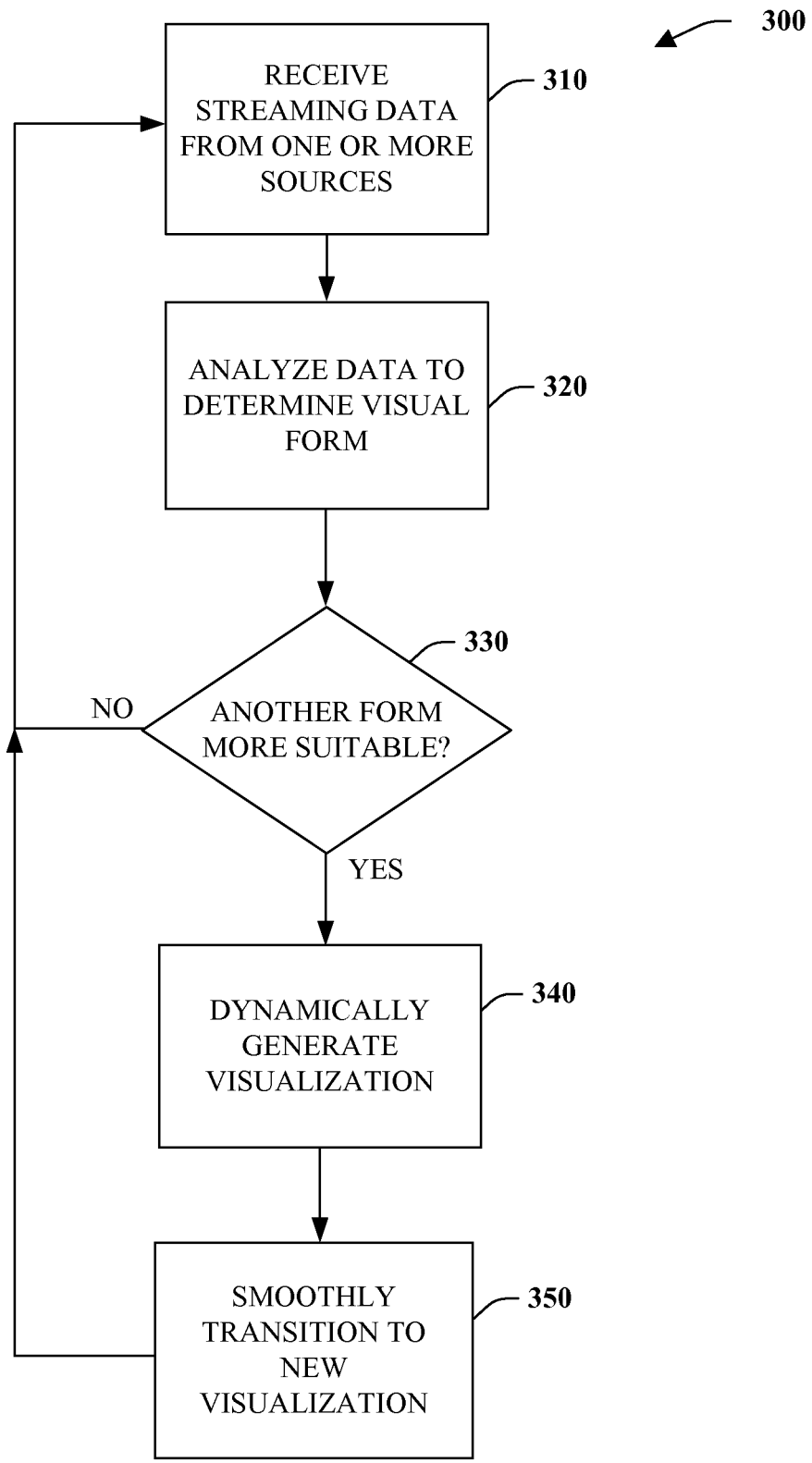
FIG. 3 is a flow diagram that illustrates a dynamic visualization process.
Figure 4:
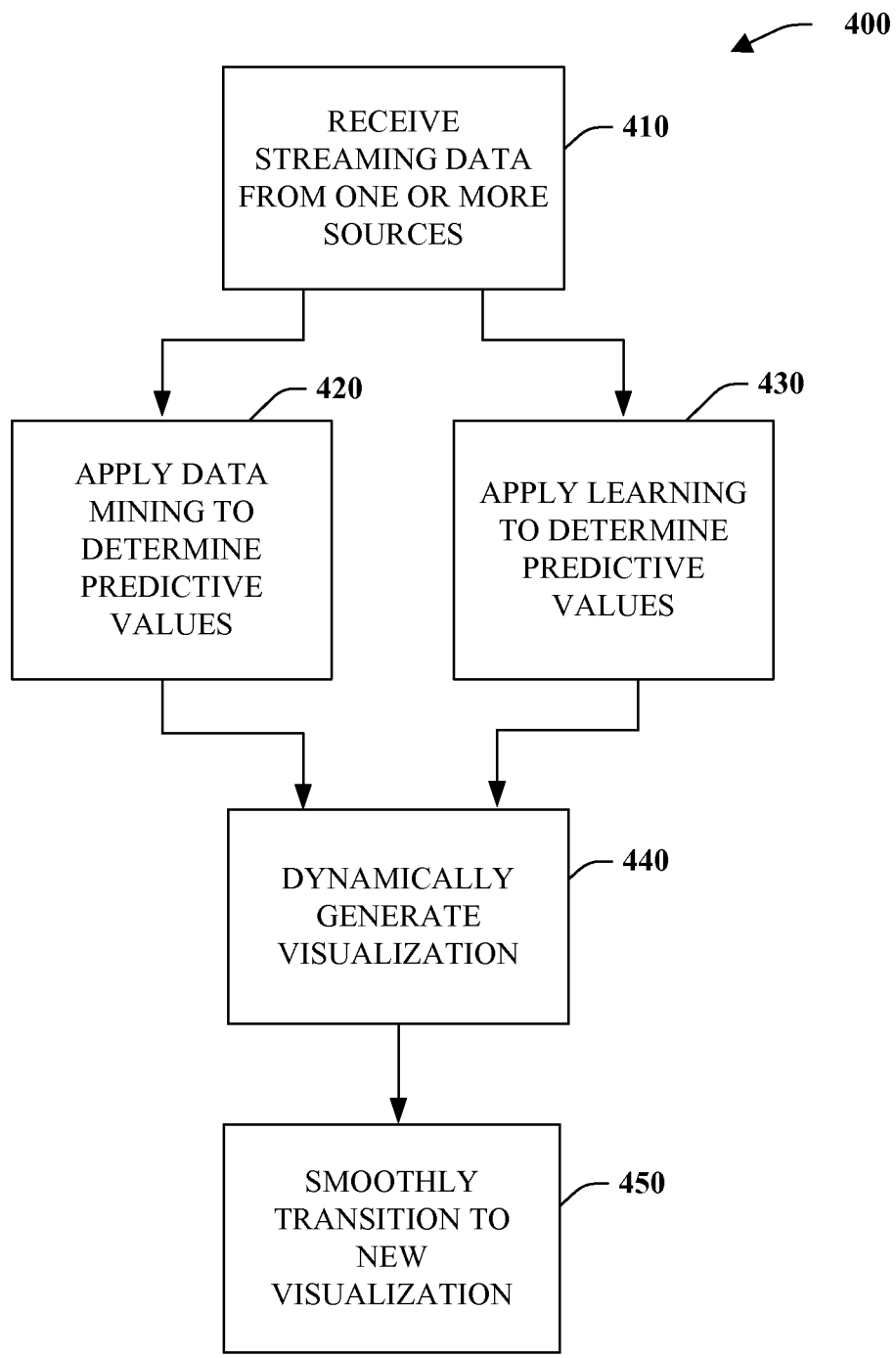
FIG. 4 is a flow diagram that illustrates a predictive process for dynamic visualizations.

Referring now to FIGS. 3 and 4, dynamic visualization processes are illustrated. While, for purposes of simplicity of explanation, the processes are shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Turning to FIG. 3, an example process 300 is illustrated that performs dynamic visualizations. Proceeding to 310, data is received from one or more data sources. As noted previously, such data can be collected or aggregated from various local or remote data sources including from public or private networks. At 320, an analysis of the received data is performed in order to determine a suitable visualization form. The analysis can include observing data over time and applying the data to a suite of potential visualizations. This can include selecting a visualization form, and performing a fitting analysis where statistical determinations are made as to how well one a selected visualization form actually fits to a particular data set. Thresholds can be set that allow dynamic selection based off of how closely a particular visualization form maps to a particular data set.

At 330, a determination is made as to whether or not a subsequent visualization form is more suitable for the present visualization of received data. Subsequent analysis can include selecting other forms, performing a fitting analysis to determine suitability, and comparing to thresholds to determine if one form is a closer match than another. This can include curve fitting or other graphical techniques, regressions, and substantially any mathematical or statistical technique that enables a determination (or selection) of a suitable form in which to visualize the data. As noted previously, the analysis at 320 and 330 can also include receiving cues (e.g., codes indicating one or more potential data display forms) in the received data stream that can indicate one form over another. If it is found that another form is not currently more suitable for presentation at 330, the process proceeds back to 310 and continues to process real-time streaming data. If a more suitable form is determined at 330, the process proceeds to 340 and dynamically generates output data for a different or subsequent visualization from an initially displayed form. It is noted that automated decisions can be made to balance trade-offs. For instance: VALUE of showing information in more detail or in a different form. This may not be a one-off decision; COST of changing the visualization (which may be disorienting).

The visualization forms can be substantially any display or output type including graphs, charts, trees, multi-dimensional depictions, video/audio displays describing the data, hybrid presentations where output is segmented into multiple display areas having different data analysis in each area and so forth. At 350, dynamic visualizations can include transitioning of one visualization form to another as data 110 changes over time and subsequent visualizations are determined more appropriate for display. Controls can be provided to allow users to adjust threshold settings for dynamic selections and how quickly one display can morph or change into another for example. After automatically transitioning to a subsequent visualization at 340 and/or 350, the process proceeds back to 310 to acquire and subsequently analyze real-time streaming data.

Referring now to FIG. 4, a predictive process 400 for generating dynamic visualizations is illustrated. In this aspect, data is received and processed from one or more data sources at 410. At 420, the data streams can be processed via data mining techniques which are described in more detail below. In addition to data mining 420, an inference process 430 can also be applied to determine one or more predictive values from the received data 410. As noted previously, such values can be employed to determine other more suitable visualizations. The predictive values can also be utilized to enhance a present visualization (or visualizations) by presenting predictive information in accordance with the respective visualization(s). After predictive information is determined from the data received at 410 via the data mining process 420 and/or the inference process 430, one or more visualizations are dynamically generated at 440, where such visualizations can employ the predictive data determined by the data mining process 420 or the inference process 430. Similar to the process 300 depicted in FIG. 3, a transition ore morphing process 450 can also be employed to facilitate smooth or gradual transitions of visualizations.

Figure 5:
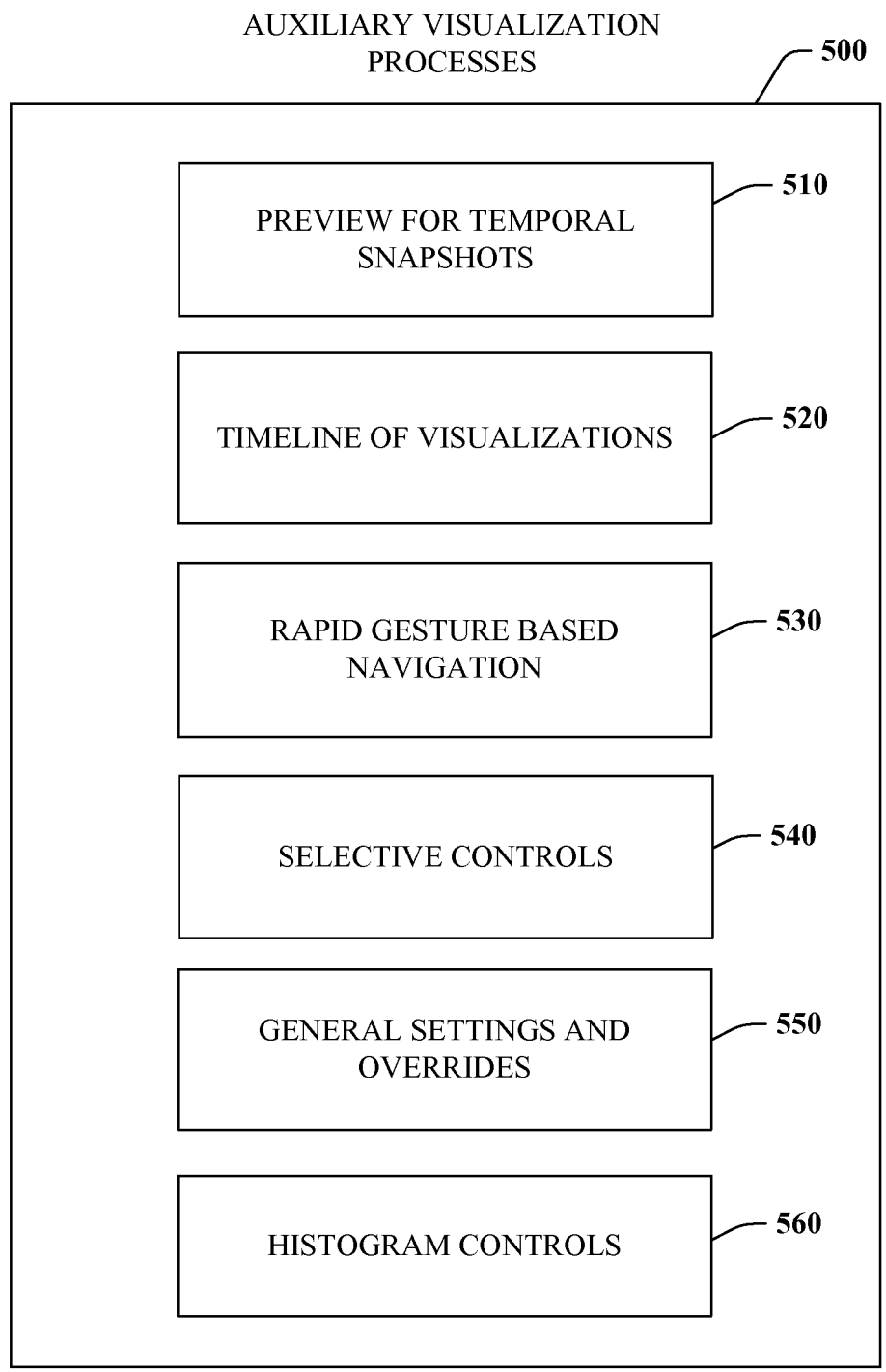
FIG. 5 illustrates example auxiliary visualization processes.

Referring now to FIG. 5, various auxiliary visualization processes 500 are illustrated. At 510, a first visualization process includes the ability to preview available temporal snapshots (or time sequence displays) for rich query submission. In the past, there have been problems visualizing business data while lacking the ability to provide temporal views of data. Thus, the process 510 allows one to quickly see the one or more visualizations of data as if another decision path had been taken previously. This includes providing visualizations of how data may appear in the future or providing visualizations in view of the manner data items were arranged or related at a different time. Previewing also enables a user to provide queries in order to leverage different visualization functionalities. Other aspects include using gestures to observe other possible visualizations based off of other temporal sequences (e.g., recreating a whole game sequence via light weight metadata). It is noted that along with changing the main visualization, secondary or tertiary visualizations can be added e.g., adding items to a scene. For example, the example of the county voting scheme may be represented as a sidebar-visualization rather than replacing the whole voting map. This secondary visualization helps clarify meaning, rather than selecting a more appropriate form.

At 520, timeline visualizations are provided using visual morphing techniques to yield a time-based view of how displays or data actually morphed even if they are totally unrelated. At 530, rapid gesture based navigation allows users to use gestures such as hand movements, voice commands, mouse commands and so forth to enhance or otherwise augment the controls on a given visualization.

At 540, one or more selective controls enable users to selectively choose visualizations based on bandwidth & variability in wireless situations, for example. This can also include other data gathering arrangements as well. This can be considered similar to observing that some links contain a video, for example, but the first frame can be shown without requiring the user to play the video. At 550, one or more general settings and/or overrides can be provided. These controls can include setting thresholds for when a given visualization is selected for a determined data pattern for example. Other controls can include how rapid one visualization morphs into another. As can be appreciated, various controls can be provided for data display options. At 560, histogram controls can be provided. This can include using scroll bars as an information display e.g., intelligent scroll where search results are placed in the scroll bar, image of code is placed in scroll bar, or scroll bar actually shows users a histogram of data.

Figure 6:
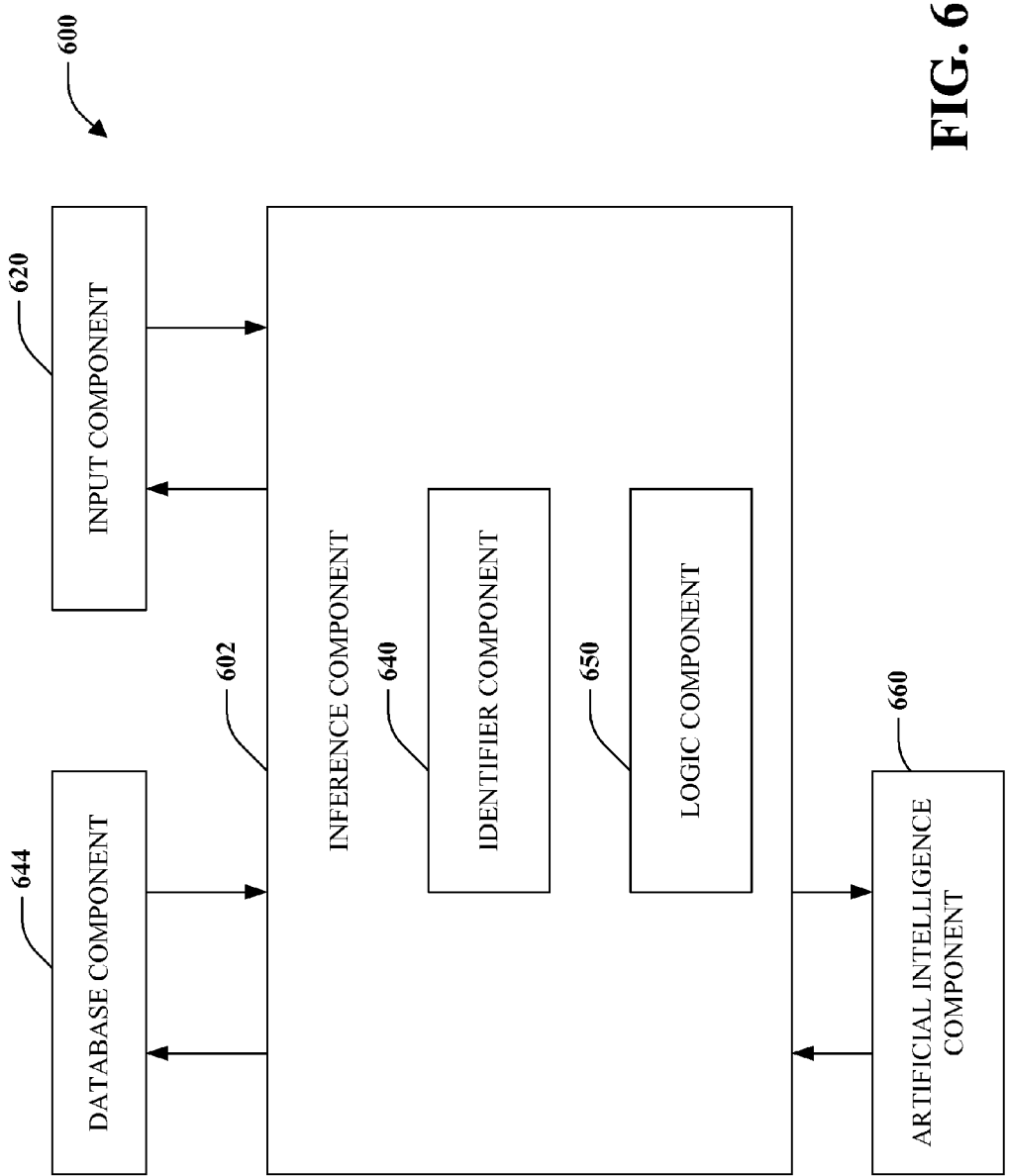
FIG. 6 illustrates an exemplary system for inferring visualizations and data predictions from a data stream.

Turning now to FIG. 6, an exemplary system 600 is provided for inferring visualizations from a data stream. An inference component 602 receives a set of parameters from an input component 620. The parameters may be derived or decomposed from a specification provided by the user and parameters can be inferred, suggested, or determined based on logic or artificial intelligence. An identifier component 640 identifies suitable control steps, or methodologies to accomplish the determination of a particular data item (e.g., observing a data pattern and determining a suitable visualization). It should be appreciated that this may be performed by accessing a database component 644, which stores one or more component and methodology models. The inference component 602 can also employ a logic component 650 to determine which data component or model to use when analyzing real time data streams and determining a suitable visualization there from. As noted previously, classifiers or other learning components can be trained from past observations where such training can be applied to an incoming data stream. From current received data streams, future predictions regarding the nature, shape, or pattern in the data stream can be predicted. Such predictions can be used to augment one or more dynamically generated visualizations as previously described.

When the identifier component 640 has identified the components or methodologies and defined models for the respective components or steps, the inference component 602 constructs, executes, and modifies a visualization based upon an analysis or monitoring of a given application. In accordance with this aspect, an artificial intelligence component (AI) 660 automatically generates prediction data by monitoring real time data as it is received. The AI component 660 can include an inference component (not shown) that further enhances automated aspects of the AI components utilizing, in part, inference based schemes to facilitate inferring data from which to augment an application. The AI-based aspects can be affected via any suitable machine learning based technique or statistical-based techniques or probabilistic-based techniques or fuzzy logic techniques. Specifically, the AI component 660 can implement learning models based upon AI processes (e.g., confidence, inference). For example, a model can be generated via an automatic classifier system.

Figure 7:
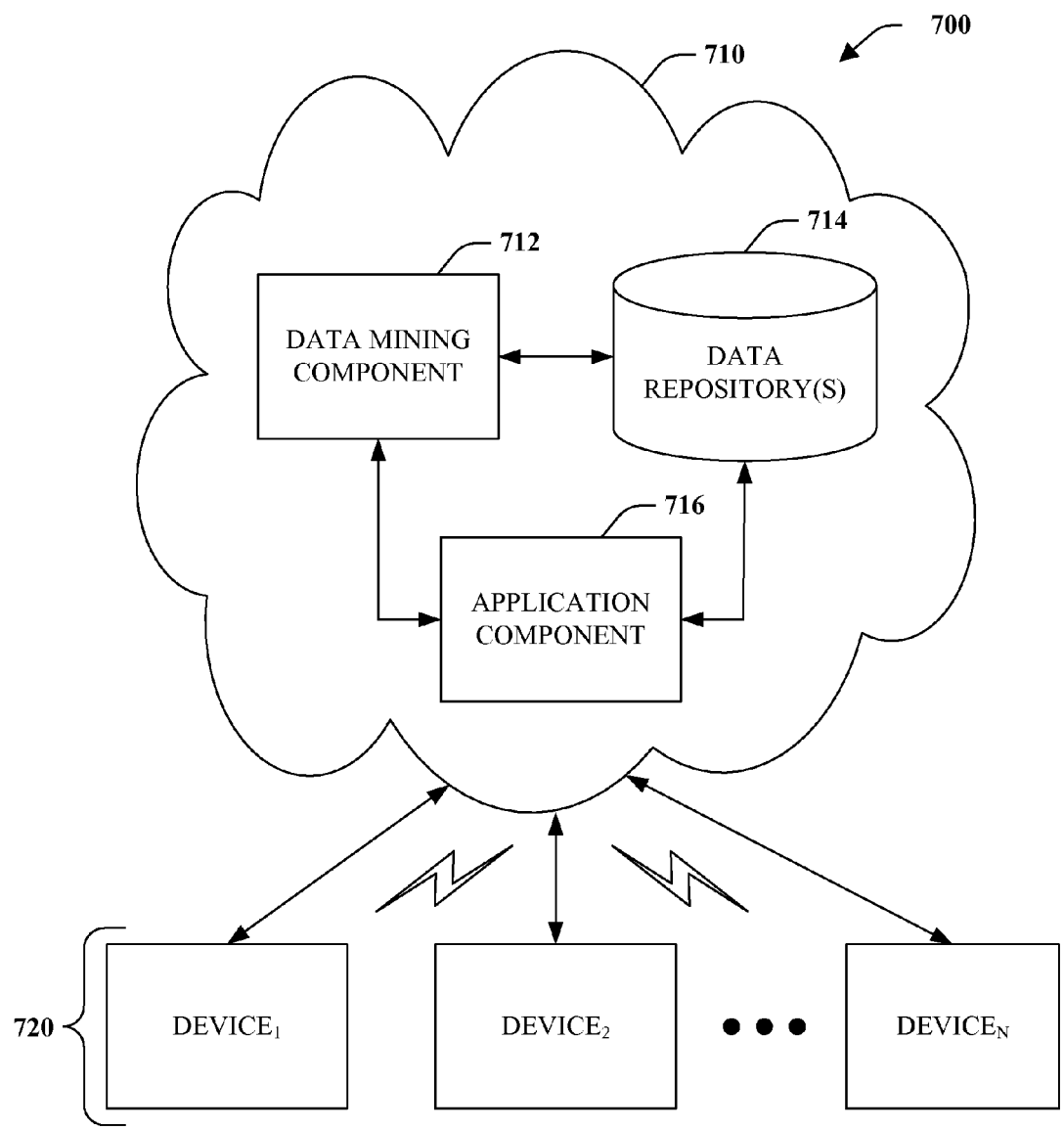
FIG. 7 illustrates a data mining system for generating predictions from a data stream.

Referring to FIG. 7, a data mining system 700 is employed to analyze real time data streams. The system 700 include a collection of components that form a cloud-based personal data mining service 710, where the cloud represents substantially any source for real-time streaming data. The service 710 can be accessible to users over a wide area network (WAN) such as the Internet via one or more computers or computing devices 720 (DEVICE1 through DEVICEN, where N is greater than or equal to one). Such devices include, without limitation, thin client devices (e.g., computer terminal, mobile device . . . ) and/or devices owned by someone other than the user.

Here, the cloud-based service 710, or simply cloud service 710, can provide functionality for data mining. The service 710 can include a data mining component 712 and data repository(s) 714. The data mining component 712 provides a mechanism for identifying or uncovering implicit, previously unknown, and potentially useful information from the data housed in the communicatively coupled data repository (s) 714. For example, the data mining component 712 can unearth patterns and/or correlations amongst data and/or patterns of data collected over time. The data mining component 712 can employ a single or combination of analysis techniques including, without limitation, statistics, regression, neural networks, decision trees, Bayesian classifiers, Support Vector Machines, clusters, rule induction, nearest neighbor and the like to locate hidden knowledge within data. In one instance, a data-mining model is built and trained. Subsequently, the trained model is employed to identify patterns and/or correlations.

The data repository(s) 714 is operable to store personal user data associated with a plurality of users. In one instance, such data can include data generated by a user, owned by a user or otherwise linked thereto. By way of example, this data can include but is not limited to personal management information (PIM data), pictures, videos, documents, e-mail, instant messages, addresses, calendar dates/scheduling information (e.g., birthdays, anniversaries, appointments . . . ), voice mail, phone logs, RSS feeds, subscriptions, bookmarks, mail lists, project management features, computing device data, tasks and location data. In one instance, such data can be supplied by individual users via one or more devices 720. Additionally or alternatively, user data can be provided by third parties such as purchase data, identity data, web interaction, and so forth.

An application component 716 facilitates interaction with users and user devices 720. The application component 716 is communicatively coupled to the data mining component 712 and data repository(s) 714. Accordingly, the application component 716 is able to retrieve and/or store personal data (or other data) with respect to the data repository(s) 714. Furthermore, the application component 716 can support receiving and/or retrieving data mining results. The application component 716 is also operable to apply an additional level of processing to data mining results to interpret the results and provide users with useful information.

Figure 8:
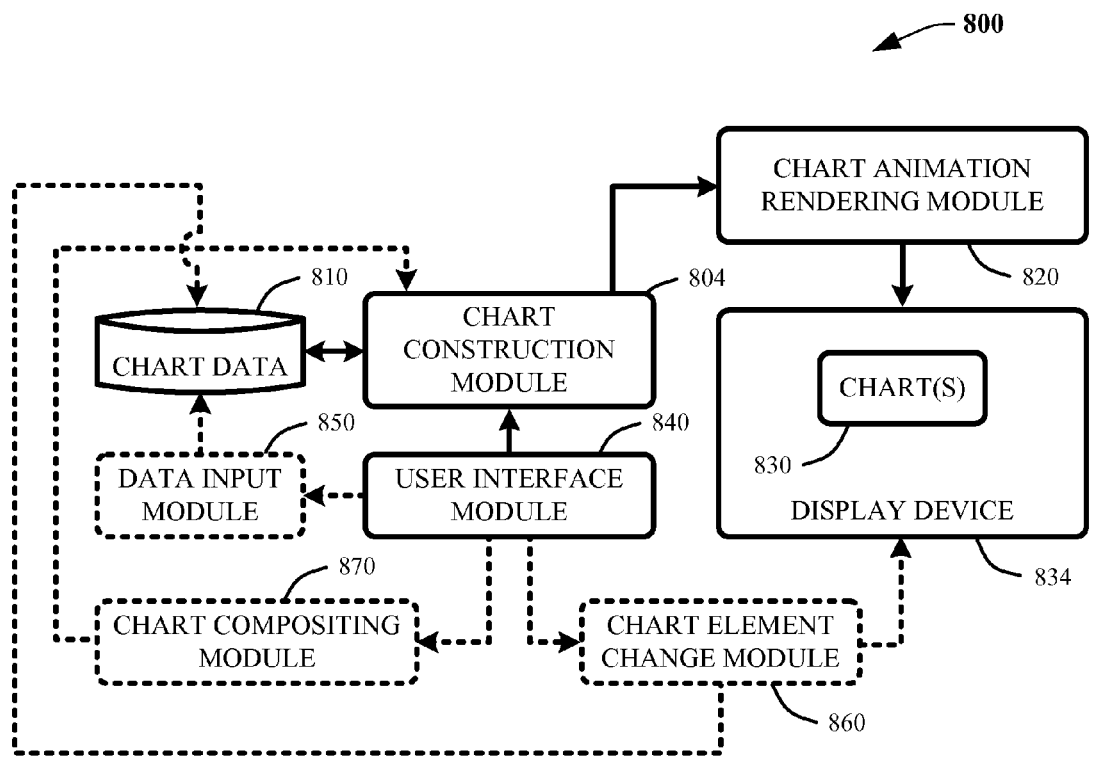
FIG. 8 illustrates an example system for transitioning or morphing between dynamic display visualizations.

Referring to FIG. 8, an example system 800 is illustrated for transitioning or morphing between dynamic display visualizations. In general, a Charting Animator process generally begins operation by using a chart construction module 804 to define parameters used to construct one or more charts (e.g., Pie Charts, Bar Charts, Line Charts, Area Charts, Plateau Charts, etc.) using one or more sets of chart data 810. The chart construction module 804 then provides these parameters to a chart animation rendering module 820 which renders chart(s) 830 on a display device 834 (or surface).

When the chart(s) 830 have been rendered on the display device 804, changes to the rendered chart(s) are enabled using any of several aspects. For example, in one aspect, a user interface module 840 is utilized to modify one or more of data elements comprising the chart data 810 via a data input module 850. Modifications to these data elements include changing the value of one or more of the data elements, adding one or more data elements, and deleting one or more data elements. In general, these data elements are maintained in a conventional computer readable format, such as, for example, in a list, table, database, and so forth. Consequently, direct modifications to the data elements by using a user interface to change the data elements via the data input module 850 can be accomplished using conventional techniques.

When data elements have been modified, the chart construction module 804 determines new chart parameters corresponding to the modified data elements, and passes those chart parameters to the chart animation rendering module 820. At this point, the chart animation rendering module 820 then morphs the existing charts(s) 830 into new chart(s) 830 using a dynamic animation that smoothly transitions from the existing chart(s) to the new chart(s) on the display device 834.

In another aspect, changes to the rendered chart(s) 830 are enabled by directly modifying one or more elements of the chart(s), such as, for example, resizing the height of one or more bars on a Bar Chart, or changing the size of a pie slice in a Pie Chart. In various aspects, direct modification of the elements of the chart(s) is accomplished via the user interface module 840 which allows the user to select one or more individual elements of one or more charts 830 using a graphical user interface provided via a chart element change module 860. This graphical user interface provides a graphical interface to chart(s) 830 being rendered on the display device 834 for resizing, moving, sorting, or deleting one or more of those chart elements. Similarly, chart elements can also be added to one or more of the chart(s) 830 via the graphical user interface provided by the chart element change module 860.

When any chart elements have been modified (by resizing, moving, sorting, deleting, adding, etc.), the chart element change module 860 then automatically modifies the corresponding data elements of the chart data 810 (or adds new values to the chart data) to fit changes made to the chart elements. For example, if a bar in a Bar Chart originally had a value of "10," then that bar was resized via the chart element change module 860 to show a value of "5" on the display device 834, then the chart element change module can change the value of the corresponding data element to "5" in the chart data 810.

Depending upon the chart(s) being displayed, many of the chart elements are often interdependent. Consequently, changes to one data element (either via the data input module 850, or via the chart element change module 860) used to construct the chart will often have an effect either on other data values, or on the displayed chart(s) 830. For example, if a pie slice in a Pie Chart is deleted or resized, or the underlying data value is changed, the other slices in the Pie Chart can be resized so that the Pie Chart retains a full pie shape. Therefore, when a change to data elements of the chart data 810 occurs (by any mechanism described herein), the chart construction module 804 determines new chart parameters corresponding to the modified data elements, and passes those chart parameters to the chart animation rendering module 820. At this point, the chart animation rendering module 820 then morphs the existing charts(s) 830 into new chart(s) 830 utilizing a dynamic animation that smoothly transitions from the existing chart(s) to the new chart(s) on the display device 834

In yet another aspect, a chart compositing module 870 is accessed via the user interface module 840 for creating a composite chart from two or more existing charts 830. In general, the user can use the chart compositing module 870 to specify (or select from a predefined list) some mathematical relationship between two or more existing charts 230. This mathematical relationship is then used to construct a composite chart by passing composite chart parameters to the chart construction module which in turn passes those parameters to the chart animation rendering module which acts to render the composite chart on the display device as an animation that morphs the existing charts into the composite chart.

Figure 9:
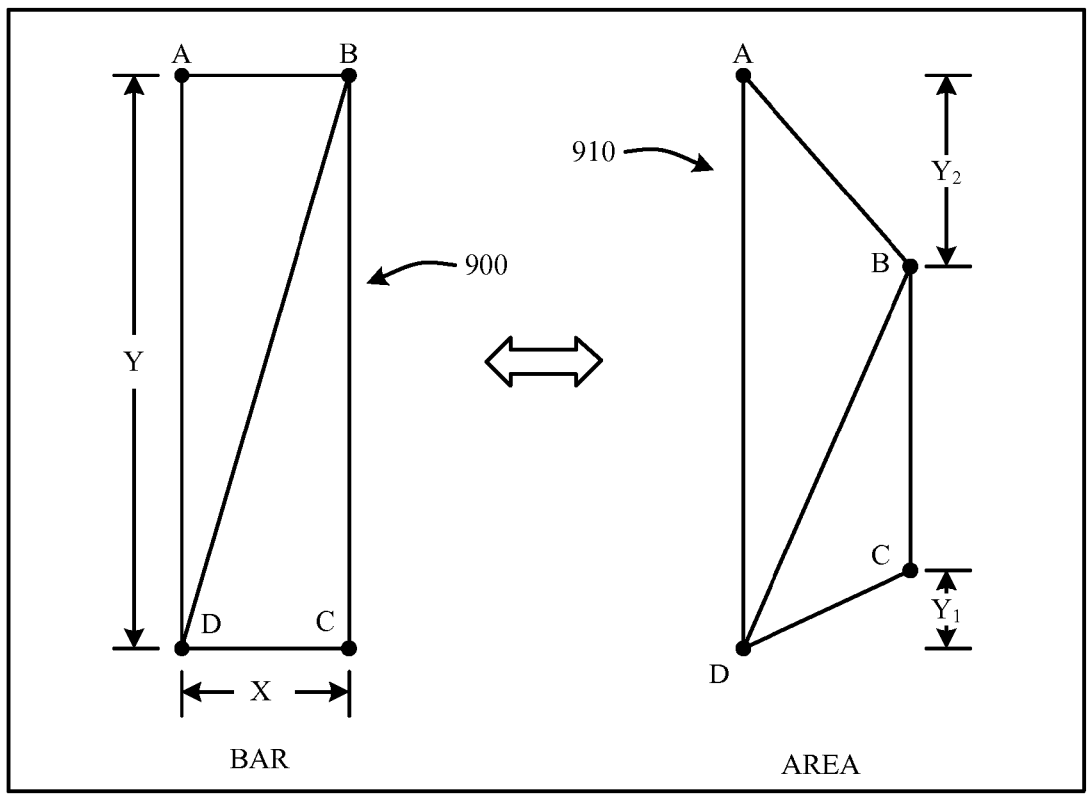
FIG. 9 illustrates an example visualization transition.

Referring to FIG. 9, an example visualization transition is illustrated. In general, the system 800 previously described has the ability to morph chart elements of one shape into chart elements of another shape, such as, for example, morphing to or from a rectangle to a line segment, area segment, or pie slice. This morphing is generally achieved by moving existing points of the various chart elements to create the new shapes, then rendering intermediate shapes to create the animated transition. Further, in addition to moving points to define a new shape, various animation components introduce new points as needed. For example, a pie slice employs many more points than a rectangular bar of a Bar Chart; so, when transitioning from a bar to a pie slice, more points are added—and when transitioning away from a pie slice, those extra points are removed.

Changing the shape of chart elements from one shape to another, such as, for example, changing a rectangular bar of a Bar Chart to a polygon of an Area Chart, or changing a rectangular bar of a Bar Chart to a pie slice of a Pie Chart is achieved by smoothly morphing the chart element from the original shape to the new shape to provide an animated transition between the shapes. This morphing can be accomplished using any of a number of morphing techniques.

For example, in one aspect, as illustrated by FIG. 9, a rectangular bar of a Bar Chart is morphed into a polygon of an Area Chart. Note that this example is not intended to limit the way in which shapes are morphed, and is provided only as a simple illustration of shape morphing techniques that may be utilized by the various animation techniques described or inferred herein.

A rectangle 900 defined by corner points $\{A, B, C, D\}$ is changed to polygon 910 by translating point B by offset Y2, and translating point C by offset Y2. Clearly, any of the four points of rectangle 900 can be translated in either the X or Y direction to provide the desired shape. Similarly, translating some or all of the points, depending upon the shape, is used for scaling the shape. For example, translating two or more of points A, B and C towards (or away from) point D can be used to scale the size of rectangle 900 either up or down. Further, any one of the four points of rectangle 900 can be collapsed into another of those points to create a triangle from the rectangle 900. In any case, once the points of the new shape have been determined, the animation from the original shape to the new shape is created by simply rendering a sequence of intermediate images in steps as small as one pixel for each point, over some period of time. As can be appreciated, a plurality of various shapes, forms, and associated dimensions can be morphed or transitioned from one shape or form to another.

Figure 10:
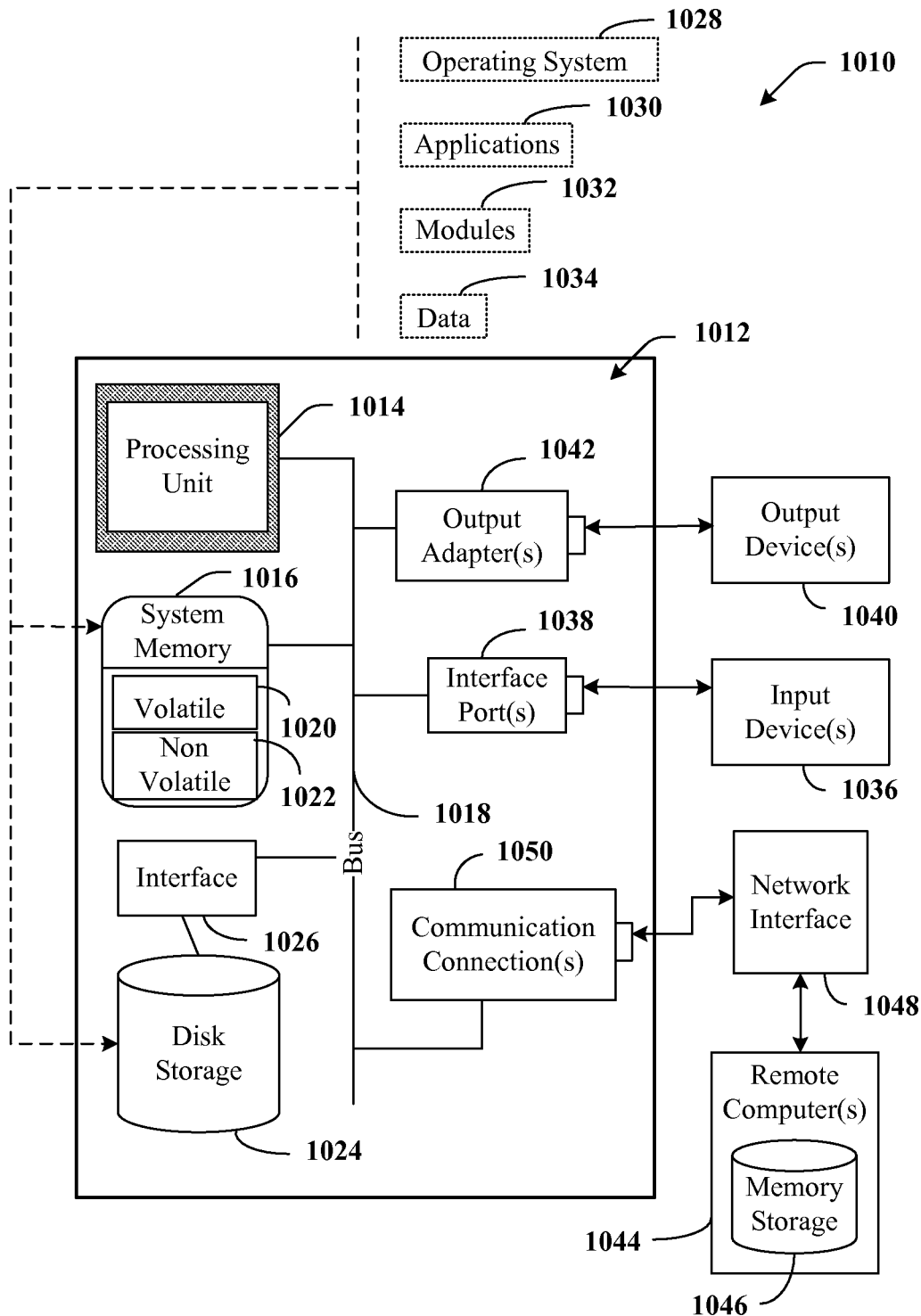
FIG. 10 is a schematic block diagram illustrating a suitable operating environment.
Figure 11:
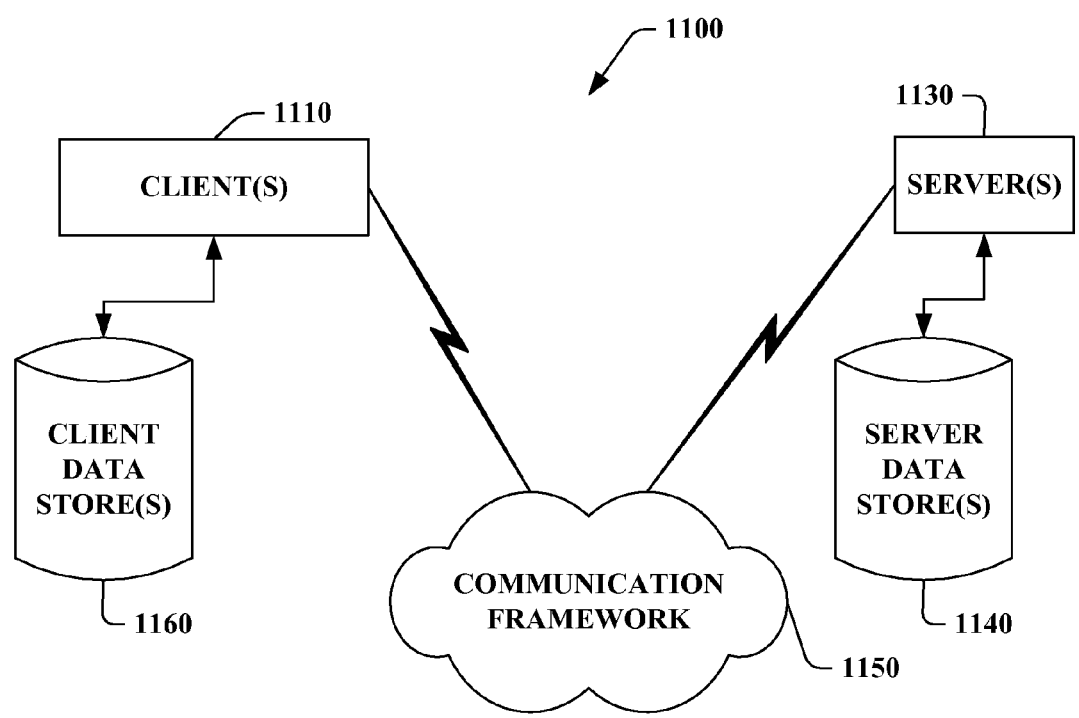
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 10, an exemplary environment 1010 for implementing various aspects described herein includes a computer 1012. The computer 1012 includes a processing unit 1014, a system memory 1016, and a system bus 1018. The system bus 1018 couple system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 64-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130. It is noted that some of the computation may be performed on either side of a network, with a thin visualization being local. Similarly, mobile devices such as a cell phone can be applicable for visualizations since there is only so much screen size, and thus making a decision about what to show is relevant.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system to facilitate dynamic data visualizations, comprising:
    a processor;
    an analysis component that is configured to be operated by the processor to periodically process an incoming data stream to:
        determine, based on processing of a first part of the data stream, an initial visualization form of a plurality of visualization forms for graphically charting a first part of the data stream in a first type of visualization format; and
        determine, based on subsequent processing of the first part of the data stream, predictive data;
        determine at least one subsequent visualization form for graphically charting the first part of the data stream and the predictive data in a second type of visualization format different than the first type of visualization format;
    a visualization component that is configured to be operated by the processor to dynamically generate the initial visualization form based on the processing of the first part of the data stream, to display the initial visualization form, and to dynamically generate and automatically transition from displaying the initial visualization form to displaying the at least one subsequent visualization form by morphing the initial visualization form to the subsequent visualization form; and
    a rollback component that is configured to enable user control of animations along dimensions of time, wherein the rollback component is further configured to cause the displaying of the subsequent visualization form to roll back to the displaying of the initial visualization form.

2. The system of claim 1, wherein the analysis component further comprises a visualization format selector, a data mining component, or an inference component.

3. The system of claim 2, wherein the analysis component is further configured to be operated by the processor to determine a fit of at least one visualization form to a data set associated with the incoming data stream.

4. The system of claim 3, wherein the analysis component is further configured to be operated by the processor to determine the fit in part based off of a threshold parameter or from an informational value and a perceptual cost of changing a visualization.

5. The system of claim 1, further comprising a transition component that is configured to be operated by the processor to control a rate at which the initial visualization form changes into the at least one subsequent visualization form.

6. The system of claim 5, wherein the transition component includes a morphing component to control animation of the change of the initial visualization form into the at least one subsequent visualization form.

7. The system of claim 1, wherein the analysis component is further configured to be operated by the processor to receive a cue in the incoming data stream indicating that the at least one subsequent visualization form is more suitable than the initial visualization form for visualizing the first part of the data stream.

8. The system of claim 7, wherein the plurality of visualization forms include at least one of a graph, a chart, a tree, a multi-dimensional depiction, a video display, audio describing data, an image, or a hybrid presentation where output is segmented into multiple display areas.

9. The system of claim 1, further comprising a component configured to be operated by the processor to analyze an event received from the incoming data stream.

10. The system of claim 9, wherein the event is propagated through aggregated data and indicates that a change has occurred in the data.

11. The system of claim 1, wherein the morphing the initial visualization form to the subsequent visualization form comprises adding a plurality of points to the initial visualization form to create at least one new shape based on the subsequent processing of the first and second parts of the data stream.

12. The system of claim 1, further comprising an auxiliary visualization component that includes at least one of a preview component for temporal snapshots, a timeline of visualizations, a rapid gesture component, or selective user controls.

13. The system of claim 12, further comprising a histogram component configured to be operated by the processor to enable search results to be visualized in a scroll area of a display.

14. The system of claim 12, further comprising a feedback component configured to be operated by the processor to enable users to guide visualizations or further query a system for subsequent predictive analysis.

15. The system of claim 1, wherein the morphing the initial visualization form to the subsequent visualization form comprises removing a plurality of points from the initial visualization form based on the predictive data.

16. A computer-implemented data visualization method, comprising:
    analyzing data from one or more data streams;
    determining a first graph for visualization of the data from a set of potential graphs, the determining based at least in part on one or more selection thresholds and the data;
    displaying the data with the first graph;
    performing a subsequent analysis of the data, the subsequent analysis including applying inference techniques to the data to generate predictive values;
    determining, based on the predictive values associated with the data, a second graph for visualization of the data and the predictive values from the set of potential graphs, the second graph having a different visualization form than the first graph; and
    transitioning between the first graph having a first visualization form and the second graph having the different visualization form, the transitioning including morphing the first graph from the first graph having the first visualization form to the second graph having the different visualization form, wherein the first graph and the second graph are different types of graphs.

17. The method of claim 16, further comprising data mining or inferring patterns from the one or more data streams to determine the predictive values.

18. One or more computer-readable storage devices encoded with instructions that are executable by one or more processors to cause the one or more processors to carry out a process for facilitating dynamic data visualizations, the process comprising:

monitoring data over time;

determining at least one visualization from the data, the visualization comprising at least a first chart of a first part of the data;

generating the visualization;

displaying the visualization;

generating a subsequent visualization with a different type of visualization format than a visualization format of the visualization based at least in part on the monitoring the first part of the data and a second part of the data, the subsequent visualization comprising at least a second chart of the first part of the data and of the second part of the data, wherein the first chart and the second chart are different kinds of charts; and transitioning between the different kinds of charts by morphing the visualization to the subsequent visualization based at least in part on one or more selection thresholds associated with a mapping from the subsequent visualization to the first part of the data and the second part of the data.

19. The one or more computer-readable storage devices of claim 18, wherein the process for facilitating dynamic data visualizations further comprises controlling animations along dimensions of time.

20. The one or more computer-readable storage devices of claim 18, wherein the first chart and the second chart include different ones of a pie chart, a bar chart, a line chart, an area chart, a plateau chart, and a composite chart.

* * * * *